(12) United States Patent
Fisher et al.

(10) Patent No.: US 9,378,493 B2
(45) Date of Patent: Jun. 28, 2016

(54) MOBILE COMMUNICATION DEVICE NEAR FIELD COMMUNICATION (NFC) TRANSACTIONS

(75) Inventors: Michelle Fisher, Oakland, CA (US); Rathin Guha, Alameda, CA (US)

(73) Assignee: Michelle Fisher, Marina Del Rey, CA (US)

(*) Notice: Subject to any disclaimer, the term of this patent is extended or adjusted under 35 U.S.C. 154(b) by 0 days.

(21) Appl. No.: 13/620,632

(22) Filed: Sep. 14, 2012

(65) Prior Publication Data

US 2013/0023209 A1 Jan. 24, 2013

Related U.S. Application Data

(63) Continuation of application No. 11/939,821, filed on Nov. 14, 2007, now Pat. No. 8,290,433.

(51) Int. Cl.
*H04B 1/38* (2015.01)
*G06Q 20/32* (2012.01)
*G06Q 20/34* (2012.01)
*G06Q 20/36* (2012.01)
(Continued)

(52) U.S. Cl.
CPC .......... *G06Q 20/3223* (2013.01); *G06Q 20/102* (2013.01); *G06Q 20/108* (2013.01); *G06Q 20/32* (2013.01); *G06Q 20/3229* (2013.01); *G06Q 20/3278* (2013.01); *G06Q 20/3552* (2013.01); *G06Q 20/367* (2013.01); *G06Q 20/382* (2013.01); *G06Q 20/3226* (2013.01); *G06Q 20/3227* (2013.01); *G06Q 20/3821* (2013.01); *H04L 63/102* (2013.01); *H04L 2209/56* (2013.01); *H04W 4/008* (2013.01); *H04W 12/06* (2013.01); *H04W 12/08* (2013.01); *H04W 88/06* (2013.01)

(58) Field of Classification Search
CPC .............. G06Q 20/3278; G06Q 20/40; G06Q 20/3223; G06Q 20/3227; G06Q 20/204; G06Q 20/4012; G06Q 20/00; G06Q 30/0267; G06Q 20/322; G06Q 20/3829; H04W 12/02; H04W 12/06; H04W 12/04; H04W 4/008; H04W 88/02; H04W 8/205; H04W 12/08; H04W 12/00; H04W 8/18; H04L 2209/80; H04L 63/083; H04L 2463/061; H04L 2463/062
USPC ............... 455/41.1, 41.2, 418, 420, 405–411, 455/414.1, 419, 550.1, 552.1, 553.1, 556.1, 455/557, 558, 41.3; 705/16, 17, 39, 40, 705/26.1, 42, 64, 75; 235/379, 380, 492
See application file for complete search history.

(56) References Cited

U.S. PATENT DOCUMENTS 6,311,167 B1 * 10/2001 Davis et al. .................... 705/35
6,807,410 B1 * 10/2004 Pailles et al. .................. 455/407
(Continued)

FOREIGN PATENT DOCUMENTS

EP       1503352 A1 *  2/2005

*Primary Examiner* — Olumide T Ajibade Akonai

(57) ABSTRACT

A method for transmitting data between a mobile communication device and a server. The method includes running a mobile application on the mobile communication device. The mobile application is hosted on the mobile communication device through the server as a Software as a Service (SaaS). The method further includes transmitting data associated with the mobile application between the mobile communication device and the server, in which transmission of the data between the mobile communication device and the server is monitored through the server.

16 Claims, 2 Drawing Sheets

(51) Int. Cl.
*G06Q 20/10* (2012.01)
*H04W 12/06* (2009.01)
*G06Q 20/38* (2012.01)
*H04W 4/00* (2009.01)
*H04W 88/06* (2009.01)
*H04L 29/06* (2006.01)
*H04W 12/08* (2009.01)

(56) References Cited

U.S. PATENT DOCUMENTS

| | | | |
|---|---|---|---|
| 7,493,284 B2 * | 2/2009 | Celi et al. | 705/39 |
| 7,784,684 B2 | 8/2010 | Labrou | |
| 8,121,945 B2 | 2/2012 | Rackley | |
| 2002/0059100 A1 | 5/2002 | Shore | |
| 2002/0063895 A1 | 5/2002 | Agata | |
| 2002/0065774 A1 | 5/2002 | Young | |
| 2002/0077918 A1 | 6/2002 | Lerner | |
| 2002/0169984 A1 | 11/2002 | Kumar | |
| 2003/0065805 A1 | 4/2003 | Barnes | |
| 2003/0093386 A1 * | 5/2003 | Keller et al. | 705/65 |
| 2003/0140004 A1 | 7/2003 | O'Leary | |
| 2004/0034544 A1 | 2/2004 | Fields | |
| 2004/0235450 A1 | 11/2004 | Rosenberg | |
| 2004/0243519 A1 | 12/2004 | Perttila | |
| 2004/0267665 A1 | 12/2004 | Nam | |
| 2005/0003810 A1 | 1/2005 | Chu | |
| 2005/0187873 A1 | 8/2005 | Labrou | |
| 2006/0018450 A1 * | 1/2006 | Sandberg-Diment | 379/93.12 |
| 2007/0004391 A1 | 1/2007 | Maffeis | |
| 2007/0145135 A1 * | 6/2007 | Jogand-Coulomb et al. | 235/451 |
| 2007/0162381 A1 * | 7/2007 | Petralia et al. | 705/38 |
| 2007/0235519 A1 | 10/2007 | Jang | |
| 2007/0293155 A1 * | 12/2007 | Liao et al. | 455/41.2 |
| 2008/0010190 A1 | 1/2008 | Rackley | |
| 2008/0045172 A1 | 2/2008 | Narayanaswami | |
| 2008/0046366 A1 | 2/2008 | Bemmel | |
| 2008/0051142 A1 | 2/2008 | Calvet | |
| 2008/0116264 A1 * | 5/2008 | Hammad et al. | 235/382 |
| 2008/0121687 A1 * | 5/2008 | Buhot | 235/375 |
| 2009/0098825 A1 | 4/2009 | Huomo | |
| 2010/0063895 A1 | 3/2010 | Dominguez | |

* cited by examiner

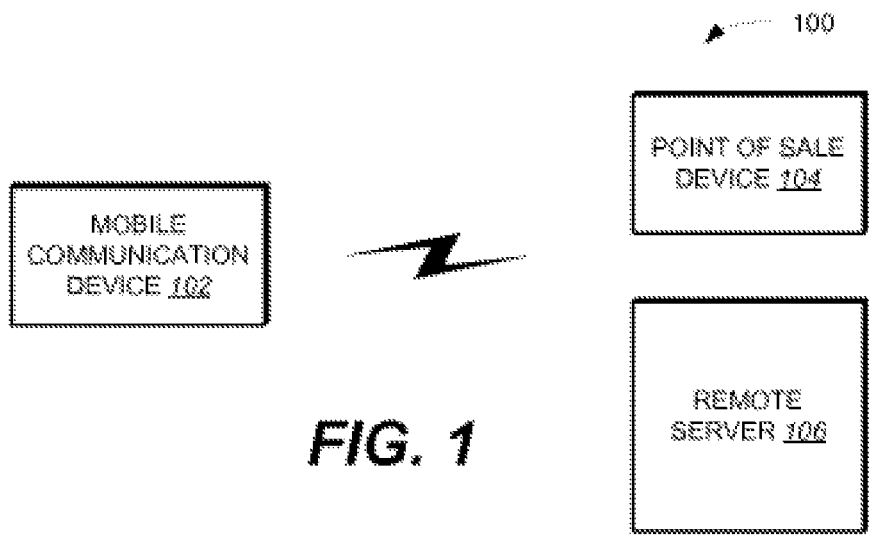
FIG. 1
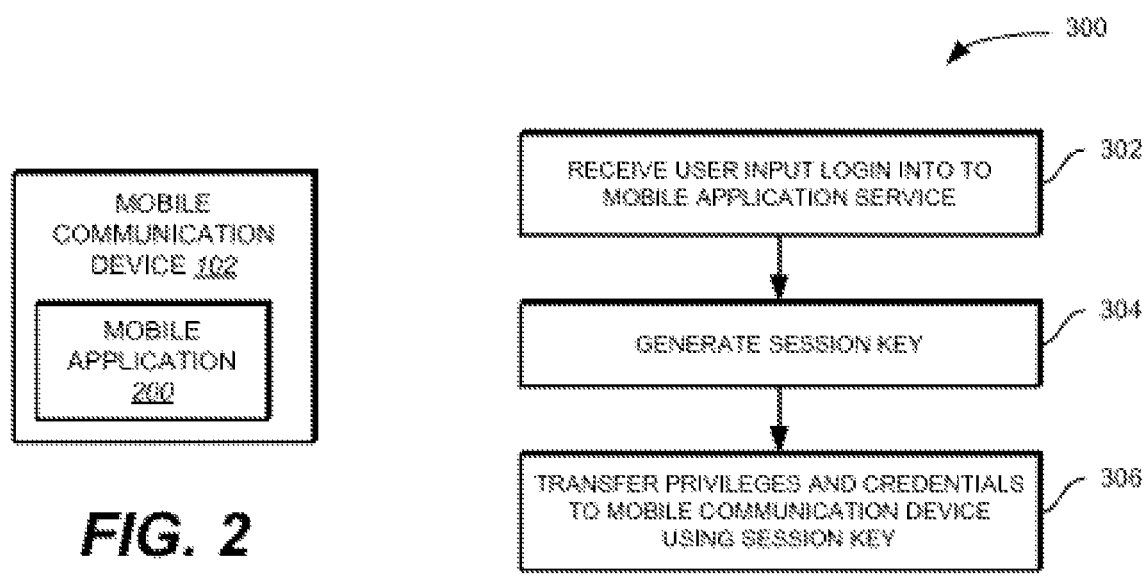
FIG. 2
FIG. 3

MOBILE COMMUNICATION DEVICE NEAR FIELD COMMUNICATION (NFC) TRANSACTIONS

CROSS-REFERENCE TO RELATED APPLICATIONS

This application is a continuation of application Ser. No. 11/939,821, filed Nov. 14, 2007, titled METHOD AND SYSTEM FOR SECURING TRANSACTIONS MADE THROUGH A MOBILE COMMUNICATION DEVICE, all of which is incorporated by reference herein in its entirety.

FIELD OF INVENTION

The present invention relates to data communications and wireless devices.

BACKGROUND OF THE INVENTION

Mobile communication devices—e.g., cellular phones, personal digital assistants, and the like—are increasingly being used to conduct payment transactions as described in U.S. patent application Ser. No. 11/933,351, entitled "Method and System For Scheduling A Banking Transaction Through A Mobile Communication Device", and U.S. patent application Ser. No. 11/467,441, entitled "Method and Apparatus For Completing A Transaction Using A Wireless Mobile Communication Channel and Another Communication Channel, both of which are incorporated herein by reference. Such payment transactions can include, for example, purchasing goods and/or services, bill payments, and transferring funds between bank accounts. Given the sensitive nature of personal money or banking data that may be stored on a mobile communication device as a result of the ability to transact payments, it is critical to protect a user from fraudulent usage due to, e.g., loss or theft of a mobile communication device.

BRIEF SUMMARY OF THE INVENTION

In general, in one aspect, this specification describes a method for transmitting data between a mobile communication device and a server. The method includes running a mobile application on the mobile communication device. The mobile application is hosted on the mobile communication device through a management server. The method further includes transmitting data associated with the mobile application between the mobile communication device and the server, in which transmission of the data between the mobile communication device and the management server is monitored through the management server.

Implementations can include one or more of the following features. Transmitting data can include generating a session key that is only valid for a given communication session between the mobile communication device and the server. The method can further include disabling use of the mobile application running on the mobile communication device through the management server by invalidating the session key. The method can further include timing out a given communication session between the mobile communication device and the management server after a pre-determined amount of time to prevent theft of data that is accessible through the mobile application. Transmitting data associated with the mobile application between the mobile communication device and the management server can include prompting a user to enter a payment limit PIN in response to a pending purchase exceeding a pre-determined amount. The payment limit PIN can be applied to all purchases globally or on a per-payment basis. The method can include use of biometrics to authenticate the user before authorizing the transaction. The mobile application can comprise a payment transaction application that permits a user to perform one or more of the following services including bill payment, fund transfers, or purchases through the mobile communication device. The mobile application can permit a user to subscribe to each of the services separately.

The details of one or more implementations are set forth in the accompanying drawings and the description below. Other features and advantages will be apparent from the description and drawings, and from the claims.

BRIEF DESCRIPTION OF THE DRAWINGS

FIG. 1 illustrates one implementation of a block diagram of a communication system including a wireless mobile communication device.

FIG. 2 illustrates one implementation of the wireless mobile communication device of FIG. 1.

FIG. 3 illustrates one implementation of a method for authenticating a user.

Like reference symbols in the various drawings indicate like elements.

DETAILED DESCRIPTION OF THE INVENTION

Figure 4:
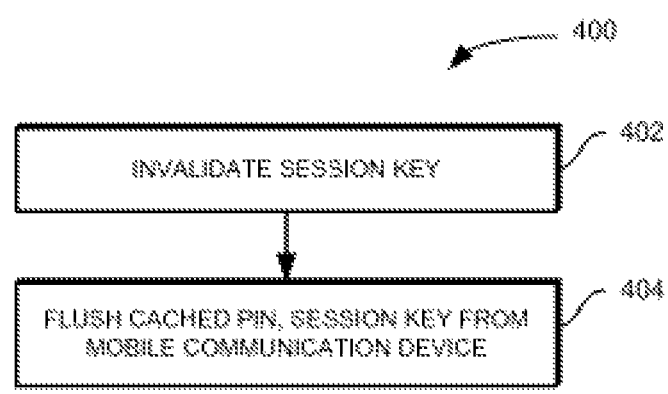
FIG. 4 illustrates one implementation of a method for remotely locking use of a mobile application on a mobile communication device.

FIG. 1 illustrates one implementation of a communication system 100. The communication system 100 includes a handheld, wireless mobile communication device 102 a point-of-sale device 104 and a remote server 106. In one implementation, the mobile communication device 102 includes a mobile application (discussed in greater detail below) that permits a user of the mobile communication device 102 to conduct payment transactions. Payment transactions can include, for example, using contactless payment technology at a retail merchant point of sale (e.g., through point of sale device 104), using mobile/internet commerce (e.g., purchase tickets and products, etc.), storage of payment information and other digital artifacts (receipts, tickets, coupons, etc), storage of banking information (payment account numbers, security codes, PIN's, etc.), and accessing banking service (account balance, payment history, bill pay, fund transfer, etc.), and so on.

In one implementation, the mobile application running on the mobile communication device 102 implements one or more of the following tools to secure data that may be stored and presented on the mobile communication device 102 as a result of a payment transaction. The mobile application can implemented one the mobile communication device 102 through a management server which hosts and operates (either independently or through a third-party) the application for use by its customers over the Internet, or other wireless network (e.g., a private network), or a wired network. In one implementation, customers do not pay for owning the software itself but rather for using the software. In one implementation, the mobile application is accessible through an API accessible over the Web (or other network). The mobile application can include a multi-factored PIN-based login and authentication, and include session keys and have command-level authentication. In one implementation, the mobile application running on the mobile communication device 102 can be remotely locked through a remote server (e.g., remote server 106). In one implementation, a PIN request can be implemented to limit the amount of purchases that can be made. Further, security codes for different payment methods can be implemented to protect a user. Each of these tools is discussed in greater detail below.

FIG. 2 illustrates one implementation of the mobile communication device 102. The mobile communication device 102 includes a mobile application 200 that (in one implementation) is provided to the mobile communication device 102 through a remote server (e.g., remote server 106). In one implementation, the mobile application is a Mobile Wallet application available from Mobile Candy Dish, Inc., of Berkeley, Calif. Providing the mobile application as a hosted service enables central monitoring and management of all security aspects of the service at the remote server. In addition, data (corresponding to a payment transaction) can be stored on the remote server (e.g., remote server 106 (FIG. 1)) in a secure manner. In one implementation, the remote server is a management server that is can be maintained by Mobile Candy Dish or a trusted third party, as described in U.S. patent application Ser. No. 11/933,351. For example, the data can be securely stored on the remote server using conventional PCI guidelines. Hence, in the event the mobile communication device 102 is lost (or stolen), no confidential data can be recovered as no data is stored on the mobile communication device 102. In addition, an added benefit is that a user can recover seamlessly by syncing new mobile communication device (via new installation of the mobile application) with the service. Thus, in one implementation, sensitive information (e.g., banking account numbers, credit card account numbers, expiry dates, and so on) are never stored on the mobile communication device. This reduces risk and exposure of the user's private information and data.

Client Login and Authentication

In general, while effort is made to minimize storage of sensitive user information and data in a memory of a mobile communication device, in one implementation, some data is stored in the memory of a mobile communication device due to reasons of performance, usability and user experience. For example, data may need to be stored on a mobile communication device in the following circumstances. Payment credentials, coupons, tickets, and so on may have to be stored on the secure element of an NFC phone. Account balance, banking payment history, etc., may be locally cached on a mobile communication device. In one implementation, a user can opt-in to save payment method security codes in the client (or mobile application) for convenience. Tickets and/or coupons may be locally cached so that a user can redeem the tickets and/or coupons in an offline mode. For example, a mobile communication device may be offline in a situation in which network connectivity inside a building is degraded, and storing a ticket and/or coupon in a local cache of the mobile communication device permits the user to access the ticket or coupon.

In addition to data partitioning, in one implementation, users have an ability to subscribe to different services. For example, User A may subscribe to "Mobile Payments" and "Mobile Banking" services, while User B may only subscribe to "Mobile Banking" and "What's Nearby" services. Hence, in one implementation, the mobile application includes a mechanism to enable/disable different services on the Client based on particular services to which users are subscribed. Table 1 below illustrates example services that are enabled/disabled based on user subscriptions.

TABLE 1

| USER | SERVICE | SUBSCRIPTION STATUS |
|---|---|---|
| User A | Money Manager | Disabled |
| User B | Money Manager | Transaction Only |
| User C | Money Manager | Transaction, Payment |
| User D | Money Manager | Transaction, Payment, BillPay, FundTransfer |

The above example control access to the Money Manager service and what privileges within the service a given user can perform. This will be used by the Client (mobile application) to enable/disable available features on the Client.

In one implementation, when a user subscribes to a mobile wallet the user is assigned credentials that include a unique WalletID, SiteKey, a user-defined PIN, as well as tokens that specify access and privileges for the different services. FIG. 3 illustrates one implementation of a method 300 for authenticating a user. User input is received (through a mobile communication device) logging into the mobile application service (step 302). In one implementation, when a user attempts to login with the client, the user is prompted to enter login credentials (e.g., mobile phone number, 1-time activation code, Wallet PIN, etc.). A session key is generated (step 304). In one implementation, the session key is a unique server-generated session key that is valid only for the duration of a given session. In one implementation, the session key is used to ensure the server can identify the client and ensure that the client has been previously authenticated. Upon a successful login, the server will transfer credentials, service access and privileges (step 306), which are locally cached on the mobile communication device. The service access and privileges control the behavior of the client. In one implementation, to prevent command spoofing, the session key is passed in every API server call. The server will validate (every time) the session key is valid. If valid, the API server call is processed. Failure to validate the session key will cause a failure. In such a case, the client will flush the cached PIN and force the user to re-authenticate (or re-login).

Remote Lock

In one implementation, a mobile application running on a mobile communication device can be remotely locked (or disabled) by invalidating a session key. Users, via calling a Customer Care, a personal web portal, or some other mechanism, can implement changes (e.g., change PIN, etc.) that causes the server to invalidate the session key. In real-time, the next attempt by the client to issue an API server call, validation of the session key will fail, which (in one implementation) causes the client to automatically flush the cached PIN and session key, and force the user to re-authenticate. In addition, the client can perform additional actions, in addition to flushing the cached PIN and session key. This includes, but is not limited to, one or more of the following: changing the secure element mode to effective temporarily or permanently disable the secure element—i.e., a user can remotely alter the state of the smart chip to lock it remotely; and deleting all cached data stored in the memory (or disk) of the mobile communication device.

Session Time Out

In one implementation, while a client is open, a user has access to transaction data. In such an implementation, users who may misplace a mobile communication device while the client is open may expose the user to risk of information theft. Therefore, in one implementation, mobile application (or client) shuts down after a period of inactivity. Additional tasks that can be associated with the shutdown procedure can include, but is not limited to, temporarily shutting down a secure element (of the mobile communication device) to prevent NFC payments, NFC coupon redemption, and NFC ticket redemption.

Payment Limit PIN

For payments (mobile commerce ticket purchase, etc.), in one implementation a user can prevent either fraudulent purchases or accidental purchases by forcing a PIN prompt when a purchase amount exceed a user-specified value. In one implementation, a user can control this behavior globally (e.g., across all users' payment methods) or on a per-payment-method basis. Thus, when a user purchases ticket and selects a payment method (to pay for purchase), if the transaction amount exceeds a specified payment method's limit, the client will trigger and prompt for the PIN. In order to proceed with purchase, the user has to enter the correct PIN. The user's input is validated against the cached PIN on the client. The payment transaction will proceed if validated. Otherwise, an appropriate response is generated to the user. Effectively, this is a mechanism for the user (not the Merchant or Issuing Bank) to throttle/control the dollar amount that can be authorized for various payments and transactions. In the event of a contactless purchase, the client controls the smart chip. In the event of an electronic purchase (ticketing, etc.), a server can manages the controls.

Local Storage of Payment Security Codes

As a convenience to users, a user can opt-in and have only the security codes (CVV, etc.) associated to each of their payment methods locally stores on the client. In one implementation, management tools are provided to add/delete/edit these security codes. In one implementation, the security codes are encrypted (Key Management of encryption key performed by a server) and then only stored in the client on the mobile communication device. In one implementation, security codes are not stored in any form on the server. The encryption key and security codes can be kept separately to prevent fraudulent usage.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

What is claimed is:

1. A method for conducting a Near Field Communications (NFC) transaction using an NEC protocol and a mobile communication device, the method comprising:
    maintaining a secure element application configured to use the NFC protocol and an identification code in a secure element memory in a secure element, the secure element, associated with a mobile communication device comprising of a mobile device memory, a mobile device processor, and a mobile device transceiver, the secure element including the secure element memory, a secure element processor and a secure element communication transceiver supporting a communication channel comprising the (NFC) protocol;
    executing the secure element application, wherein the secure element application is executed by the secure element processor in response to detection of a near field communication inductive signal by an NFC terminal, and execution of the secure element application facilitates transfer of the identification code to the NFC terminal using the NFC protocol and further wherein the NFC terminal transfers the identification code to a management server which transmits the identification code to a transaction server for processing of the NFC transaction using a payment method corresponding to the identification code, wherein the NFC terminal is configured to use the NFC protocol.

2. The method of claim 1, further wherein a mobile application running on the mobile device uses biometrics to authenticate the user before the NFC transaction is processed.

3. The method of claim 1, further comprising applying a coupon during the near field communication payment transaction.

4. The method of claim 1, further wherein a digital artifact is delivered from the management server to the mobile device through the mobile device-transceiver.

5. The method of claim 4, wherein the digital artifact comprises a receipt, ticket, advertisement, or coupon.

6. The method of claim 1, further wherein a digital artifact is received through the secure element communication transceiver at the secure element after purchase from the NFC terminal.

7. The method of claim 6, wherein the digital artifact comprises a receipt, coupon, ticket, and/or return/refund policy.

8. The method of claim 1, further wherein the management server transmits the identification code to the transaction server associated with the identification code.

9. A mobile device using a near field communication protocol for an NFC transaction, the mobile communication device comprising:
    a mobile device memory;
    a mobile device processor; and
    a mobile device transceiver;
    wherein the mobile device is associated with a secure element, the secure element including a secure element memory, a secure element-processor, a secure element communication transceiver supporting a first communication channel comprising the near field communications (NFC) protocol, wherein the secure element memory maintains a secure element application configured to use the NFC protocol and an identification code, wherein the secure element application is executed by the secure element processor in response to detection of a near field communication inductive signal by an NFC terminal and execution of the secure element application facilitates transfer of the identification code to the NFC terminal the secure element communication transceiver and further wherein the NFC terminal transfers the identification code to a management server which transmits the identification code to a transaction server for processing of the NFC transaction using a payment method corresponding to the identification code, the NFC terminal configured to use the NFC protocol.

10. The mobile device of claim 9, further wherein a mobile application running on the mobile device uses biometrics to authenticate the user before the NFC transaction is processed.

11. The mobile device of claim 9, further comprising applying a coupon during the near field communication payment transaction.

12. The mobile device of claim 9, farther wherein a digital artifact is delivered from the management server to the mobile device through the mobile device-transceiver.

13. The mobile device of claim 12, wherein the digital artifact comprises a receipt, ticket, advertisement, or coupon.

14. The mobile device of claim 9, wherein the digital artifact is received through the secure element communication transceiver at the secure element after purchase from the NFC, terminal.

15. The mobile device of claim 14, wherein the digital artifact comprises a receipt, coupon, ticket, and/or return/refund policy.

16. The mobile device of claim 9, further wherein the management server transits the identification code to the transaction server associated with the identification code.

* * * * *